United States Patent [19]

Grant et al.

[11] Patent Number: 4,694,397

[45] Date of Patent: Sep. 15, 1987

[54] BANKING/BROKERAGE COMPUTER INTERFACE SYSTEM

[75] Inventors: David J. Grant, Marlborough; Andrew M. Vignola, Sr., Cheshire, both of Conn.

[73] Assignee: The Advest Group, Inc., Hartford, Conn.

[21] Appl. No.: 686,976

[22] Filed: Dec. 27, 1984

[51] Int. Cl.⁴ .............................................. G06F 15/30
[52] U.S. Cl. .................................... 364/408; 364/406; 235/379
[58] Field of Search ... 364/200 MS File, 900 MS File, 364/ 300, 401, 406, 408; 235/379–382, 382.5

[56] References Cited

U.S. PATENT DOCUMENTS

| | | | |
|---|---|---|---|
| 4,194,242 | 3/1980 | Robbins | 364/200 |
| 4,270,042 | 5/1981 | Case | 235/379 |
| 4,321,672 | 3/1982 | Braun et al. | 235/379 |
| 4,334,270 | 6/1982 | Towers | 364/300 |
| 4,346,442 | 8/1982 | Musmanno | 364/408 |
| 4,412,287 | 10/1983 | Braddock, III | 364/408 |
| 4,423,313 | 12/1983 | Tanigaki | 235/379 |
| 4,423,318 | 12/1983 | Gotou | 235/379 |
| 4,536,647 | 8/1985 | Atalla et al. | 235/379 |
| 4,562,540 | 12/1985 | Tateisi et al. | 235/379 |
| 4,566,066 | 1/1986 | Towers | 364/408 |
| 4,608,485 | 8/1986 | Miura | 235/379 |

*Primary Examiner*—Gary V. Harkcom
*Attorney, Agent, or Firm*—McCormick, Paulding & Huber

[57] ABSTRACT

Apparatus is provided for interfacing a banking system and a brokerage system having a number of brokerage offices. Clients having both a brokerage and a banking account transact both brokerage and banking activities from the brokerage office. Automatic transaction processing within and between the banking and brokerage systems is created in response to a client transaction activity originated at a brokerage office.

3 Claims, 6 Drawing Figures

BANKING/BROKERAGE COMPUTER INTERFACE SYSTEM

BACKGROUND OF THE INVENTION

The present invention relates to financial business systems and deals more specifically with a data processing methodology and related apparatus for effectuating a on-line realtime banking/brokerage computer interface system.

The banking/brokerage system of the present invention uses a data processing methodology and appropriate interface logic apparatus to integrate the standard functions and operations normally associated with separate and independent banking and brokerage institutions or systems. Traditionally, banking and brokerage systems are autonomous and maintain completely separate and independent data file information and records. A brokerage client desiring for example, to deposit or withdraw funds from his bank account must go to the bank to conduct the transaction. If a client desires, for example, to purchase securities at a brokerage office and does not have sufficient funds in his brokerage account to complete the transaction, he must first go to his bank and withdraw funds from his bank account or perhaps take a loan and then deposit those funds to his brokerage account to have sufficient funds in the brokerage account to complete the transaction.

A client may at other times have excess funds in his brokerage account due, for example, to the receipt of monies from a sale and may wish to deposit those excess funds to his bank account. In conventional banking and brokerage systems, the client must first withdraw the excess funds or a portion thereof from his brokerage account and then deposit them in his banking account. If funds are needed in the brokerage account to make up a deficiency due to subsequent transactions, such as, for example, changed margin limits, etc., the clients must withdraw funds from the banking account and deposit them to his brokerage account to cover any deficiency.

A general aim of the invention is therefore to provide a banking/brokerage computer interface system to access data file information for a customer having both a banking and brokerage account to automatically create transaction processing within and between the banking and brokerage systems. Although the banking and brokerage systems could be combined into one large monolithic system, it is preferable and advantageous that the two systems remain autonomous and retain their ability to function as independent, stand alone system so that an operational malfunction in either the banking or brokerage systems does not effect the operation of the other functioning system and administrative changes, enhancements, etc., can be made to either system witout effecting the other.

Another general aim of the present invention is to create independent and separate transactional activity historical records for each system on a per transaction basis rather than on a net basis. That is, for example, a record is created showing a deposit to and withdrawal from a brokerage account and a deposit to a banking account of the withdrawn brokerage funds. This feature facilitates compliance with regulatory keeping regulations and provides a detailed audit track.

These general aims are acheived in accordance with the invention, and as described in more detail hereinafter, by a data processing methodology and appropriate logic interface apparatus to effectuate automatic access to data file information contained in separate and independent banking and brokerage systems to create transaction processing within and between systems in response to a transaction, administrative change, etc., to automatically generate the appropriate changes in the data file information of both systems to permit up to the minute input information retrieval.

Other objects and advantages of the invention will be apparent from the following description and claims taken in conjunction with the accompanying drawings.

SUMMARY OF THE INVENTION

The present invention resides in apparatus for interfacing a banking and brokerage system to automatically create transaction processing within and between the systems. Each of the systems has a number of client accounts and data file storage for information characterizing each of the accounts and at least one brokerage account client has a corresponding banking account in the banking system.

Data representative of a number of client desired transaction activities is entered at a brokerage system office and is received and verified by the banking system. The transaction activities includes depositing and withdrawing funds at a brokerage office to and from a banking account and purchasing and selling investment instruments. Client brokerage and banking account information is automatically up-dated in response to an activity and a transfer of monies transaction is automatically generated between the brokerage and banking systems to reflect the desired transaction activity entered at the brokerage system office.

The invention further resides in storing each transaction activity associated with the client's brokerage and banking accounts and determining for client, funds above and below a predetermined threshold fund amount. Automatic transaction processing occurs to deposit excess brokerage funds into the corresponding banking account and to withdraw banking funds and deposits them into the corresponding brokerage account to satisfy the threshold fund amount.

DETAILED DESCRIPTION

Figure 1:
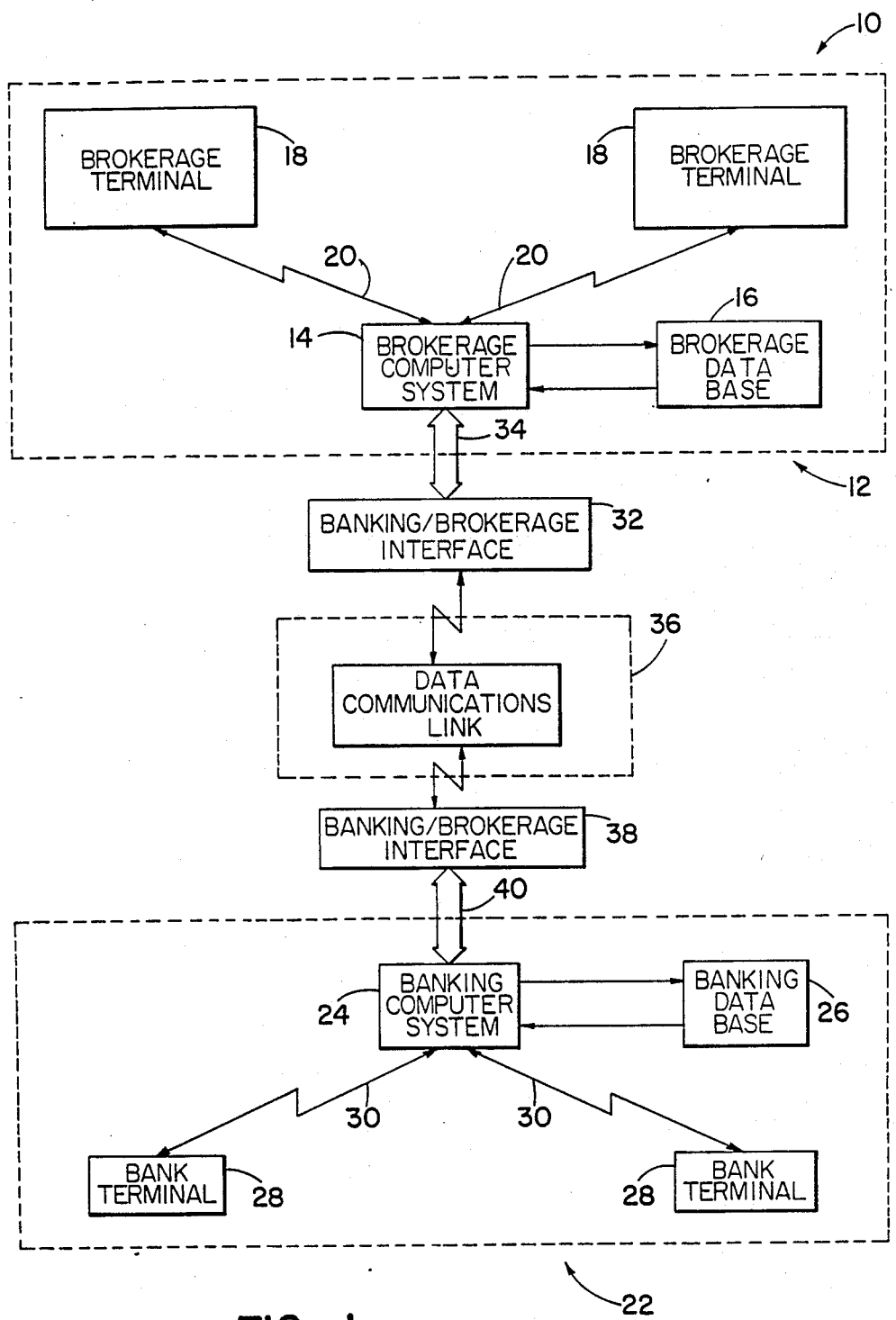
FIG. 1 is a schematic functional block diagram showing the major components of a banking/brokerage system embodying the present invention.

Referring now the the drawings and FIG. 1 in particular, a schematic block diagram showing the major functional components of a banking/brokerage computer interface system embodying the present invention is shown therein and designated generally by the numeral 10. A conventional brokerage system contained within the dotted line box 12 comprises a brokerage computer system 14 and a brokerage data base 16. Brokerage data terminals 18, 18 communicate with the brokerage computer system via communication links 20, 20. A conventional banking system contained within the dotted line box designated generally at 22 comprises a banking computer system 24 and an associated banking data base 26. Bank terminals 28, 28 communicate with the banking computer system in the normal manner via the communication lines 30, 30. As described in more detail hereinbelow, a customer having a dual status, that is, one having both a banking and a brokerage account, can transact both brokerage and banking activities from the brokerage system 12 through the banking/brokerage computer interface system of the present invention.

Briefly, the banking/brokerage interface system recognizes at the start of either a banking or brokerage activity initiated from a brokerage terminal 18, 18 whether a customer has a dual status. The status information is transmitted to the banking/brokerage interface portion designated generally at 32 from the brokerage system 12 via a data bus designated generally at 34. The interface 32 initiates a connection to and provides the appropriate supervisory signals for the data communications link designated generally at 36 to access the banking/brokerage interface designated generally at 38 at the banking system location. The interface 38 in turn communicates with the banking computer system via a data bus designated generally at 40 to complete the data information path between the banking system 22 and the brokerage system 12. It will be appreciated that the brokerage computer system 14 and the banking computer system 24 may be located at a substantial distance from one another such as, for example, the brokerage computer system may be located in New York and the banking computer system may be located in San Francisco, Calif. The data communication link 36 connecting the brokerage and banking systems may be, for example, a satelite system, overland microwave or conventional switched data networks such as those provided by common carriers.

In addition to brokerage initiated activities, such as, for example, deposits and withdrawals to and from brokerage and/or banking accounts, administrative functions such as new account openings, name and address changes, banking and brokerage account inquiries, etc., the banking/brokerage computer interface system automatically carries out daily and monthly settlement routines for the banking system and end-of-day brokerage processing for the brokerage system and utilizes the information to automatically calculate the funds available to a client from both the bank and the brokerage systems. The banking/brokerage interface system creates the necessary transactional activities at the bank/brokerage systems in response to the available funds condition to satisfy monies movement to or from an account. These functions are described in greater detail hereinbelow.

Figure 2A:
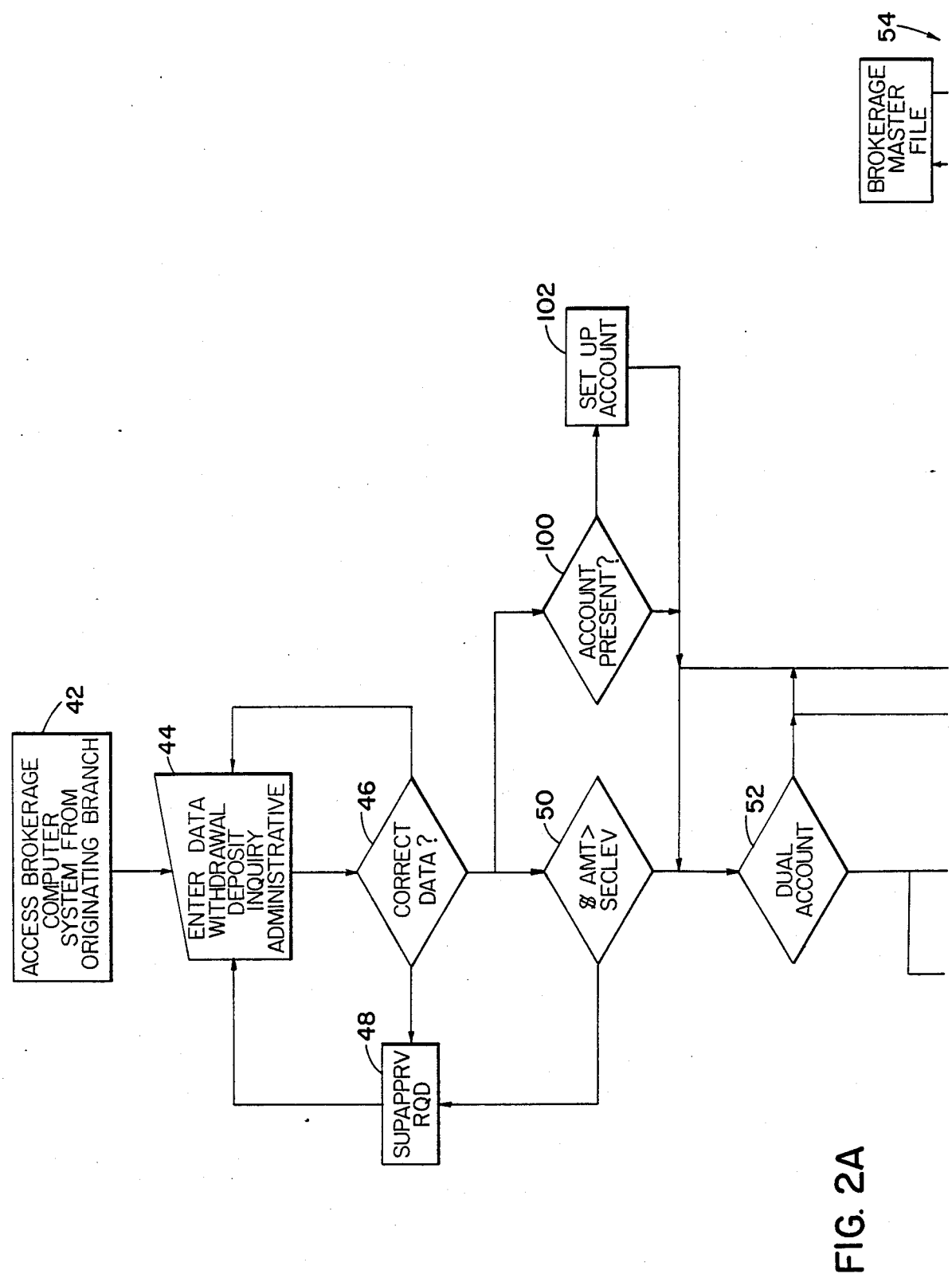
FIGS. 2A, 2B, and 2C are a schematic flowchart depicting the data processing methodology and structure in accordance with the present invention for a banking/brokerage interface system.
Figure 2B:
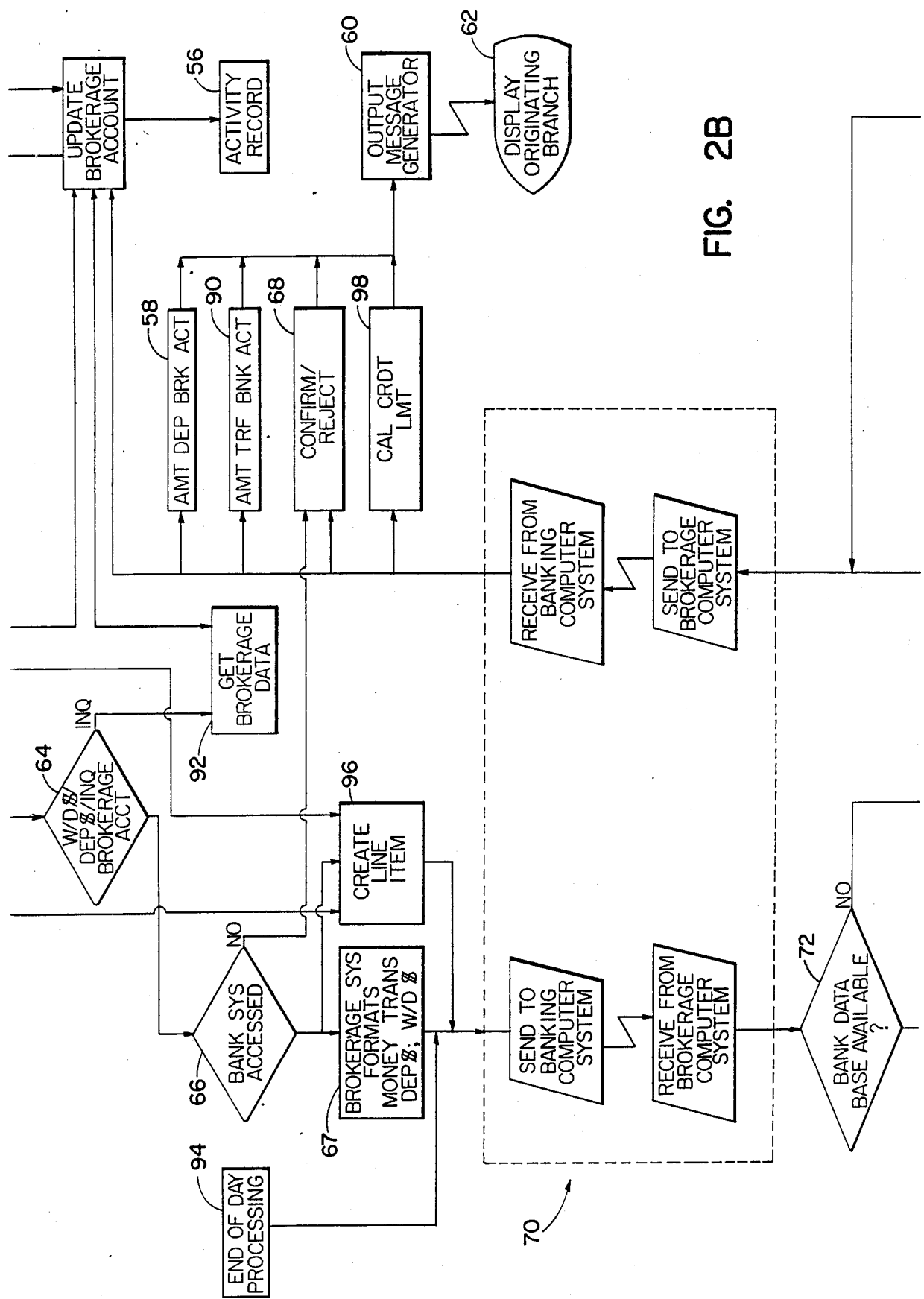
Figure 2C:
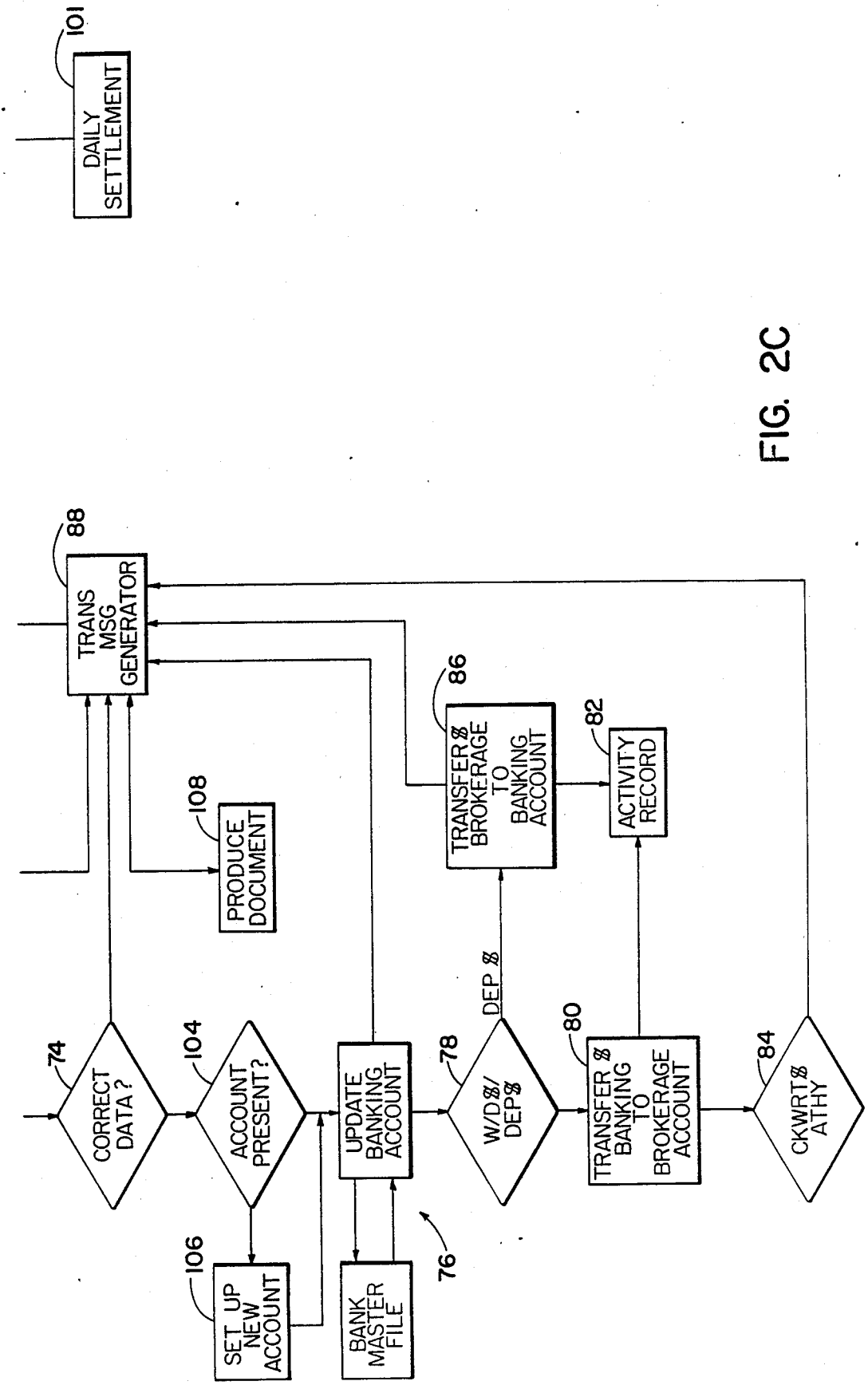

Referring now to FIG. 2, a schematic flow chart depicting the data processing methodology and structure in accordance with the present invention is shown therein for banking/brokerage activities initiated at a brokerage office. The brokerage computer system 14 of FIG. 1 is accessed by brokerage operations personnel or a brokerage salesperson through a pre-established sign-on procedure and is indicated generally by the function block 42. The sign-on procedure identifies the brokerage location initiating the activity, the salesperson or operations personnel entering the data or making a request and the security level assigned to the identity code of the initiator. The appropriate data is entered via a brokerage terminal 44 in accordance with the requested acitivity. For example, withdrawal information would include the amount of the check and the account number; deposit information would include the form of the funds, account number, amount; an account inquiry would include the account number and an action code corresponding to the type of inquiry requested. Administrative information might include establishing a new account at the brokerage office and would include an account number, client information and action requested.

An on-line computer associated with the brokerage system receives the data entered at brokerage terminal 44 and verifies at 46 that the data is correct and in a form usable by the brokerage/banking system. In the case of a deposit or withdrawal, the on-line computer verifies the account's existence and whether the deposit is cash or check. The computer system also initiates a supervisory approval or assistance request through function block 48 when a withdrawal amount exceeds a predetermined threshold associated with the security level of the brokerage personnel handling the withdrawal or deposit. The security levels are established for all authorized personnel having access to the brokerage system and are checked at the security check function block 50. In an account inquiry the data is checked to verify that the entered action code is valid, the account is present in the brokerage file data base and the requestor is a salesperson authorized to service the account. For a new account or change to an existing account, the data entered is incorrect if changes violate predetermined edits, account options do not agree with predetermined valid codes, the name and address are not complete, the tax identification number is missing or the appropriate dividend withholding code is not set. If any of the data entered is determined to be incorrect an appropriate message is activated at the brokerage terminal 44 to advise the requestor of an error.

The data verification function performed by the on-line computer system at 46 also includes calculation of the amount of any funds in the brokerage account that are available for withdrawal or other usage. The on-line computer system also recognizes that certain conditions occurring in the brokerage account require that the available funds be manually computed and determines those accounts that require special handling and advises the originator to contact authorized personnel for approval of the withdrawal. The authorization request overrides the available funds calculation performed by the on-line computer system at function block 46.

One condition triggering special handling is, for example, where a brokerage margin account extends credit based on the value of securities in the account. The absence of proper pricing of securities owned by the client reduces the amount of funds available however, the banking/brokerage interface system authorizes the payment of funds related to other securities or cash held for the customer. When the price of the securities owed to the brokerage house by the customer is unavailable such as, for example, short stock and short options, the banking/brokerage interface system cannot determine whether funds are available in the account. In addition, brokerage regulations require that a brokerage house take certain actions such as, for example, file with the stock exchange for an extension of purchase payment time, liquidate client purchases, etc., at the end of each day of processing. When transactions are billed late or adjustments are made, actions that took place may need to be corrected and actions that should have taken place may need to take place. In general, brokerage systems do not maintain sufficient previous pricing information and historical data to properly reverse all actions taken to recalculate the available funds in the account. Therefore, it is necessary to manually retrive the appropriate previous pricing information and historical data in order to calculate the available funds in the account.

Once the entered data is verified to be correct the client information within the brokerage computer system data file is checked at function block 52 to determine whether or not the client has dual status. If dual status is not indicated and the customer desires to deposit or withdraw money from his brokerage account, the brokerage computer system records the amount of the deposit, updates the balance on the brokerage account 54 and creates an historical activity record 56 on the brokerage data base which activity record is used among other things for end-of-the-month reporting and end-of-the-day brokerage processing shown generally in function block 94 and described in further detail in the discussion of FIG. 3. An appropriate message is prepared which described the action that has taken place and in the case of a deposit, the message "amount deposited to brokerage account number" is activated in function block 58. The output data from function block 58 is sent to an output message generator 60 which prepares an on-line screen of information to describe the action that has taken place. This information is properly formatted for transmission to a display terminal 62 located at the brokerage location originating the activity.

When the client information indicates dual status, the banking/brokerage system interface recognizes that the banking computer system must be accessed to complete the transaction activity. Function block 64 determines the activity requested at the brokerage terminal and responds accordingly to initiate a connection to the banking computer system. The necessary data communication signals required to complete the connection to the banking system through the communication link generally designated at 70, are generated in function block 66. A "hand-shaking" sequence verifies that both the banking and the brokerage computer systems are able to transmit and receive data information from one another. If for any reason the brokerage computer system is not able to access the banking computer system, a reject message is created in a confirm/reject message processor function block 68 and causes the output message generator 60 to transmit the reject message to the display terminal 62 at the requesting brokerage terminal. The generated reject message contains the reason that the brokerage computer system is not able to access the banking computer system.

Once the banking system is accessed and transmission is verified, the brokerage computer system formats at function block 68 a transfer of monies transaction in a digitally formatted code which includes the transaction type, the customer identity, the account number and other pertinent data necessary to create the bank transfer. In the case of a deposit to the client's banking account, the transfer of monies transaction is formatted to create a bank transfer deposit from the brokerage account. In the case of a bank transfer withdrawal, that is, a payment made to the client at the brokerage office location, the information necessary to create a bank withdrawal is similarly formatted.

The transfer of monies transaction information is sent to the banking computer system from the brokerage computer system via the communication link 70 established between the banking and brokerage computer systems. The information data processing control is now transferred to the banking computer system portion of the banking/brokerage interface system.

After the banking computer has accepted the transaction information sent by the brokerage computer system, a test is performed at function block 72 to determine if the banking data base is available to process the received information and if the account is present in the data file. If the banking data base is available, the transaction information is checked at function block 74 for correct format, account number and other pertinent information necessary to complete the transaction. If the data correct verification at function block 74 determines that the received data is incorrect or that the account cannot be found during the bank data base availablility test 72, a transaction message generator 88 prepares appropriate reject message information relative to the reject reason for transmission to the brokerage computer through the communication link 70. The received messaage information is sent to the output message generator 60 via the message processor function block 68 to generate a reject message which message is transmitted to the display terminal 62 at the brokerage office initiating the activity. Such a reject message may be, for example, "bank system unavailable" if the the bank appears to be off-line or may be an error message if the bank computer cannot find the account in the banking data file or cannot process the received data due to incorrect information transmitted from the brokerage system. If the received data is correct, a standard up-dating of the bank account at function block 76 is performed to record the transaction details.

If a customer is withdrawing funds at a brokerage office and his brokerage account has insufficient funds to cover the withdrawal, the the banking computer system generates the appropriate transaction steps in the banking system to withdraw money from the customer's bank account and to create a transfer transaction at a transfer processor 80 to transfer the withdrawn money to the client's brokerage account. The banking computer system creates a historical activity record 82 of the withdrawal transaction on the bank data base for subsequent usage and auditing purposes and daily settlement processing shown generally in function block 101 and described in further detail in the discussion of FIG. 4. The banking system also sends a message via function block 84 and the transaction message generator 88 to the originator of the transaction giving him authority to write a check for the amount of the withdrawal at the brokerage office.

If the transaction initiated at the brokerage office is a deposit, the banking computer generates the appropriate transaction steps to reflect the transfer of funds from the client's brokerage account to his banking account. The banking computer system creates an historical activity record 82 of the deposit transaction on the bank data base. A transaction disposition message is generated by the banking computer system at 88 to indicate the activity that has taken place and transmits the message via the communication link 70 to the brokerage computer. In the case of a deposit to a bank account a message is generated at function block 90 indicating the amount of money transferred to the bank account. This information is sent to the output message generator 60 which properly formats the message and transmits it to the display terminal 62 at the brokerage office initiating the activity.

In the case of a withdrawal at a brokerage office, the message received from the banking computer system causes the brokerage computer system to create an activity record 56 to reflect a deposit to the brokerage account from the bank account and to up-date at 54 the customer's brokerage account balance to reflect the deposit from the bank. Another activity record 56 is created by the brokerage computer system to up-date the brokerage account 54 to reflect that funds have been transferred from the client's brokerage account in the form of a payout to the client. Consequently, the activity record 56 reflects the transfer of funds from the bank account to the brokerage account and the withdrawal from the brokerage account paid to the client to provide an audit trail for the transaction steps that have taken place.

Considering now an account inquiry from a brokerage office, the brokerage computer system data base is accessed at function block 64 to select the appropriate brokerage data file containing the customer's information. The selected data is processed at the brokerage data function block 92 prior to being sent to the banking computer system for use in calculating the customer's credit. If no data is available for the account in the data base, a reject message is generated at the message processor 68 which message is sent to the output message generator 60 for transmission to the display terminal 62 at the originating brokerage office to indicate that data is not available for the entered brokerage account, the account is not on file or that the brokerage data base is not available.

The brokerage computer system also creates a function block 96 a line item request for the client's bank account balance and sends the request together with the client's brokerage account data to the banking computer system via the communication link 70. As described above, the banking computer accepts the transaction information, attempts to process it against the bank data base at 72 and the checks the data function block 74 for correctness to insure that the transaction has the correct format, account number and any other pertinent data necessary to complete the inquiry activity. If the data received is correct, the bank account is up-dated at 76 and the banking computer system causes a message to be generated in the transaction message generator function block 88 for transmission to the brokerage computer system in response to the inquiry to indicate that the request is being processed or to indicate a rejection with reasons for rejection if the received data is not correct.

The client's bank account balance is transmitted via the communication link 70 to the brokerage computer system. The bank account information and the brokerage account information retrived from the brokerage data base is combined in the calculate credit limit function block 98 to calculate the client's available balance at the bank, any free credit at the brokerage system and any available funds in the client's brokerage margin account. The credit limit information is sent to the output message generator 60 which formats the message information and transmits it to the display terminal 62 at the requesting brokerage office.

Still referring to FIG. 2, administrative information, such as, for example, opening a new account at a brokerage office, name and address changes, change in options, etc., is entered at the brokerage data entry terminal 44. The entered administrative information is checked at 46 to determine whether the entered data is correct, for example, the validity of changes that are allowed to be made at a brokerage office, account options agreeing with valid codes, complete information regarding name and address, tax identification number, etc., and if an error is present, an appropriate error message is displayed at the brokerage data entry terminal.

If the entered data is correct, the brokerage data base is examined and tested at 100 to determine if the entered account number is currently an account listed in the brokerage data base. If the account is not found, the brokerage data base is accessed and the information establishing a new account is entered into the brokerage data base at 102 for the client. In addition to establishing the new account, the brokerage computer system updates or creates data as necessary in the client's brokerage account regarding the client's account status at the bank, that is, a dual status account. If the account is determined to be a brokerage only account, the confirm/reject processor 68 receives the information and causes the output message generator 60 to display a message at the diaplay terminal 62 at the originating brokerage office confirming that a brokerage-only account has been establish for the client. If the information in the brokerage system data base indicates that the client has a dual account status, the brokerage computer system formats the entered data at 96 to bank specifications and creates the bank name and address and the necessary line items to establish an account at the bank. The information is sent to the bank via the communication link 70 as described hereinabove. The normal tests for data base availability and data correctness are performed and if a test is failed, a message is returned to the brokerage computer system in a similar manner as described above to inform the originating brokerage office that establishment of a banking account has been rejected and the appropriate reasons therefore.

If the received data is determined to be correct, the bank the account is tested at 104 to determine whether the entered account exists in the banking data base file. If an account does not exist, a new banking account is set up at function block 106 using the data provided by the brokerage system and the banking account records contained within 76 are up-dated to reflect the new account. All required documents such as, for example, signature cards, etc., necessary for bank usage are created by the document production function block 108. The transaction message generator 88 generates a message which is sent to the brokerage system for display at the display terminal 62 at the requesting branch in the normal manner to confirm the administrative change entered at the brokerage terminal and to inform the originator of the transaction steps that have taken place.

Figure 3:
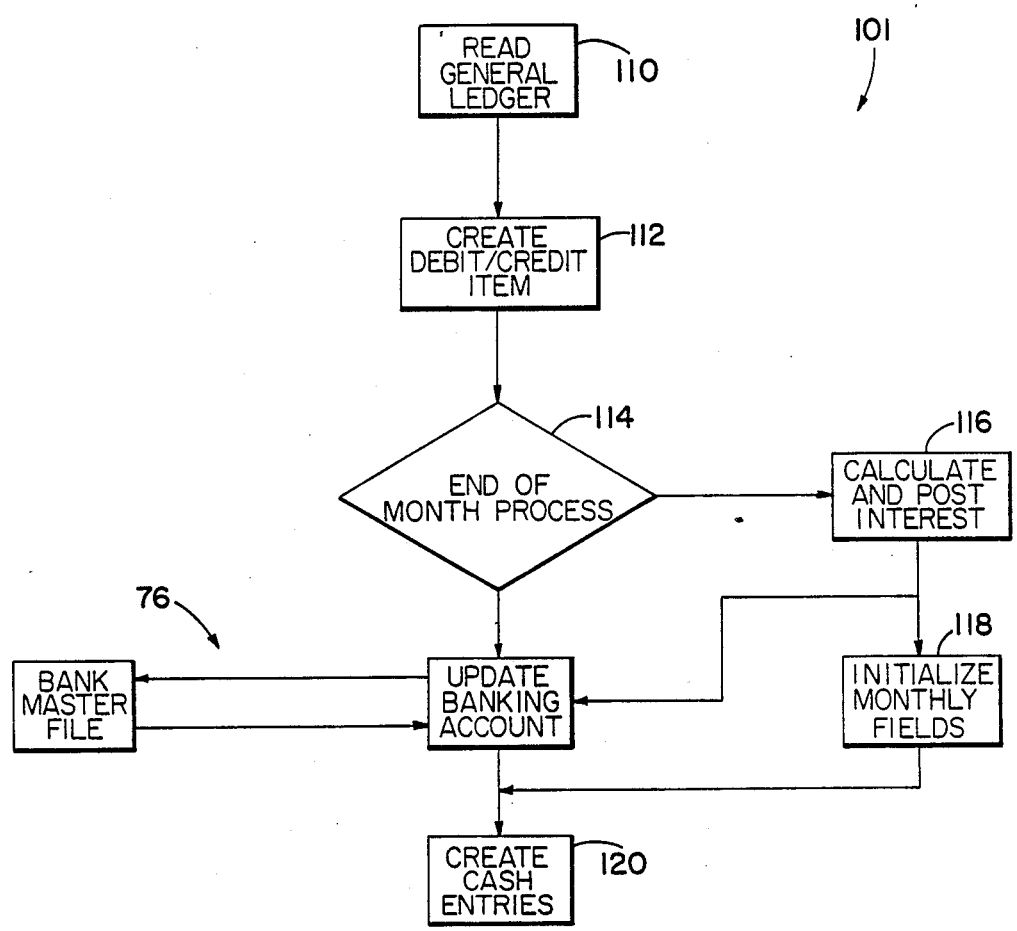
FIG. 3 is a schematic flowchart depicting the data processing methodology utilized by the present invention to effectuate a daily settlement between a brokerage system and a bank system.

Referring now to FIG. 3, a schematic flowchart is shown therein depicting the data processing methodology utilized by the present invention to create a daily settlement between the banking system and the brokerage system. An off-line program contained within 110 at the banking computer system reads the bank general ledger data base files and extracts entries needed for settlement with the brokerage computer system. Once the entries have been extracted, the banking computer program contained within 112 nets all extracted items and creates debit and credit items. The program at 114 also determines whether month-end processing is required and if so interest is calculated at funciton block 116 for each account and is posted to the accounts contained within the banking system data base 76. After the interest has been calculated, posted and retained, the accumulated information contained within the monthly field memory 118 is re-initialized and set to accumulate the next months total interest. If month-end processing is not required, the account information contained within the data base 76 is up-dated with the debit and credit items created in function block 112. Once the accounts have been up-dated, cash entries are created within function block 120 for updating the general ledger files with the settlement information for each account having some type of activity during the day.

Figure 4:
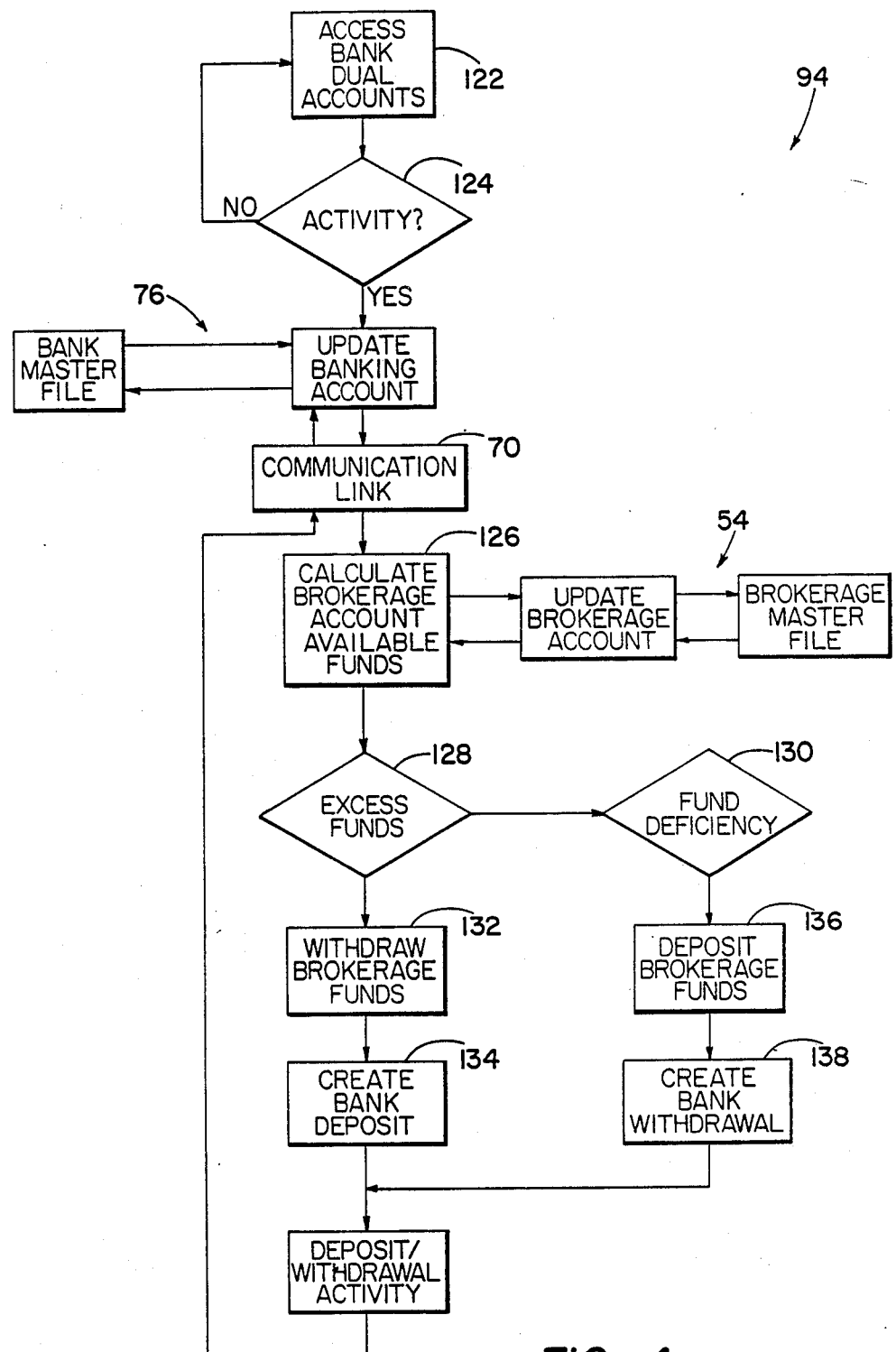
FIG. 4 is a schematic flowchart depicting the data processing methodology utilized by the present invention to effectuate an end-of-the-day brokerage processing.

Referring now the FIG. 4, a schematic flowchart depicting the data processing methodology utilized to effectuate end-of-the-day brokerage processing is shown therein. At the end of each day the banking computer system files are accessed by function block 122 to extract information on all accounts having a dual status in order to calculate the withdrawal balance for the accounts. If function block 124 determines that there has been activity during the day for an account, the banking computer verifies that the account has been updated to reflect the deposit, withdrawal or any other activity affecting the account status.

The up-dated activity information calculated in the banking computer system is transmitted to the brokerage computer system via the communication link 70 in the normal manner. The brokerage computer system receives the bank account current available balance information from the banking computer system for those client's having a dual status account. The brokerage data base function block 126 calculates the available funds in the client's brokerage account using the day's closing security prices, settlement of trades and any activity that occurred during the day at the brokerage office which effects the account. The bank available funds and the brokerage available funds are paired or matched at function block 126 for each account. The client's brokerage account balance is examined at function blocks 128 and 130 to determine whether excess funds or a fund deficiency, respectively exists for the account. If an account has an excess of funds, the brokerage computer system updates the brokerage account balance and creates an historical activity record at 132 to reflect the withdrawal funds from the brokerage account. The brokerage computer system formats a deposit at function block 134 in the amount of the available excess funds for deposit to the bank account.

If funds are required to satisfy a trade settlement or the status of margin accounts, the brokerage computer system at function block 136 updates the brokerage balance for the deficient account in the normal manner and creates an activity record as to reflect the deposit of funds into the brokerage account. The brokerage computer system at function block 138 formats a bank withdrawal for the deficient account.

Finally, the brokerage computer system prepares a data file at function block 140 that contains the deposits and withdrawals for each of the accounts accessed by function block 122 and sends this formatted information to the banking computer system for processing via the communication link 70. The banking computer system receives the end-of-day brokerage processing information from the brokerage computer system and updates the activity record of each dual status client to reflect the end-of-day brokerage processing.

A banking/brokerage computer interface system for integrating the standard functions and operations of separate and independent banking and brokerage systems has been described in one preferred embodiment. However, it will be understood that numerous changes and modifications may be had without departing from the spirit of the invention and therefore, the invention has been described by way of illustration rather than limitation.

We claim:

1. Apparatus for interfacing a banking system and a brokerage system to automatically create transaction processing within and between said banking and said brokerage systems, said brokerage system having a number of brokerage offices, said apparatus comprising:

a banking system having a plurality of client bank accounts;

bank account data file means for storing information characterizing each client bank account;

a brokerage system having a plurality of client brokerage accounts, at least one of said brokerage account clients having a bank account in said banking system;

brokerage account data file means for storing information characterizing each client brokerage account;

means for entering data at a brokerage office into said brokerage system for a client having bank and brokerage accounts, said data being representative of a plurality of client desired transaction activities, at least one of said plurality of activities characterized by a first activity wherein a bank account deposit transaction is initiated at said brokerage system, a second of said plurality of activities characterized by a bank account withdrawal transaction initiated at said brokerage system and a third of said plurality of activities characterized by a purchase or sale of investment instruments at said brokerage system;

first means responsive to said entry means activity data and said brokerage data file means for updating said client brokerage account characterizing information and for automatically generating data representative of a monies transfer transaction between said brokerage system and said banking system for said client banking and brokerage accounts;

receiving and verification means at said banking system for receiving and verifying said monies transfer transaction data;

second means responsive to said transfer transaction data and said banking data file means for updating said client bank account characterizing information to reflect said client desired transaction activity entered at said brokerage system office;

wherein monies deposited at said brokerage system by said client and identified for repository at said banking system in a bank account associated with said client making the deposit at said brokerage system are deposited in said client bank account in response to monies transfer transaction data generated by said brokerage and banking systems for said client banking and brokerage accounts in accordance with an investment strategy associated with said client, said client brokerage account deposited monies being available for withdrawal from said client bank account by said client at said banking system;

wherein monies deposited at said banking system by said client and identified for repository at said brokerage system in a brokerage account associated with said client making the deposit at said banking system are deposited in said client bank account in response to monies transfer transaction data generated by said brokerage and banking systems for said client banking and brokerage accounts in accordance with an investment strategy associated with said client, said client banking account deposited monies being available in said client brokerage account to satisfy brokerage transactions by said client brokerage account, and wherein monies withdrawn from said client bank account by said client at said banking system are satisfied from monies reposing in said client bank account to the extent such withdrawal monies do not exceed the monies available in said client bank account, additional monies representative of the difference in monies between the desired withdrawal and available bank account monies being automatically transferred from said client brokerage account to said client bank account in response to monies transfer transaction data generated by said brokerage and banking system for said client banking and brokerage accounts in accordance with an investment strategy associated with said client.

2. Apparatus for interfacing a banking system and a brokerage system as defined in claim 1 further characterized by:

first storage means for recording each transaction activity associated with each client brokerage account including fund transfer to and from said brokerage account;

second storage means for recording each transaction activity associated with each client banking account including fund transfer to and from said banking account;

means for selecting from said plurality of client brokerage accounts, each brokerage account client having a corresponding banking account;

means for determining for said each selected client brokerage account the amount of funds above and below a predetermined fund amount;

means for automatically withdrawing an amount of funds above said threshold from each of said client brokerage accounts and depositing said withdrawn amount in said client corresponding banking account, and means for automatically withdrawing an amount of funds equal to the amount of funds below said threshold for each of said client brokerage accounts below said threshold from said client corresponding banking account and depositing said withdrawn funds to said client corresponding brokerage account.

3. Apparatus for interfacing a banking and a brokerage system as defined in claim 2 further characterized by:

message processor means for generating a plurality of messages, each of said plurality of messages corresponding to a transaction processing activity response at said brokerage and banking system, and means for displaying said transaction processing activity message at said brokerage system data entry means initiating said client desired transaction activity.

* * * * *